Sept. 13, 1932.    C. D. JOHNSON    1,876,953
METHOD OF MAKING WIRE TAPE
Filed April 3, 1930
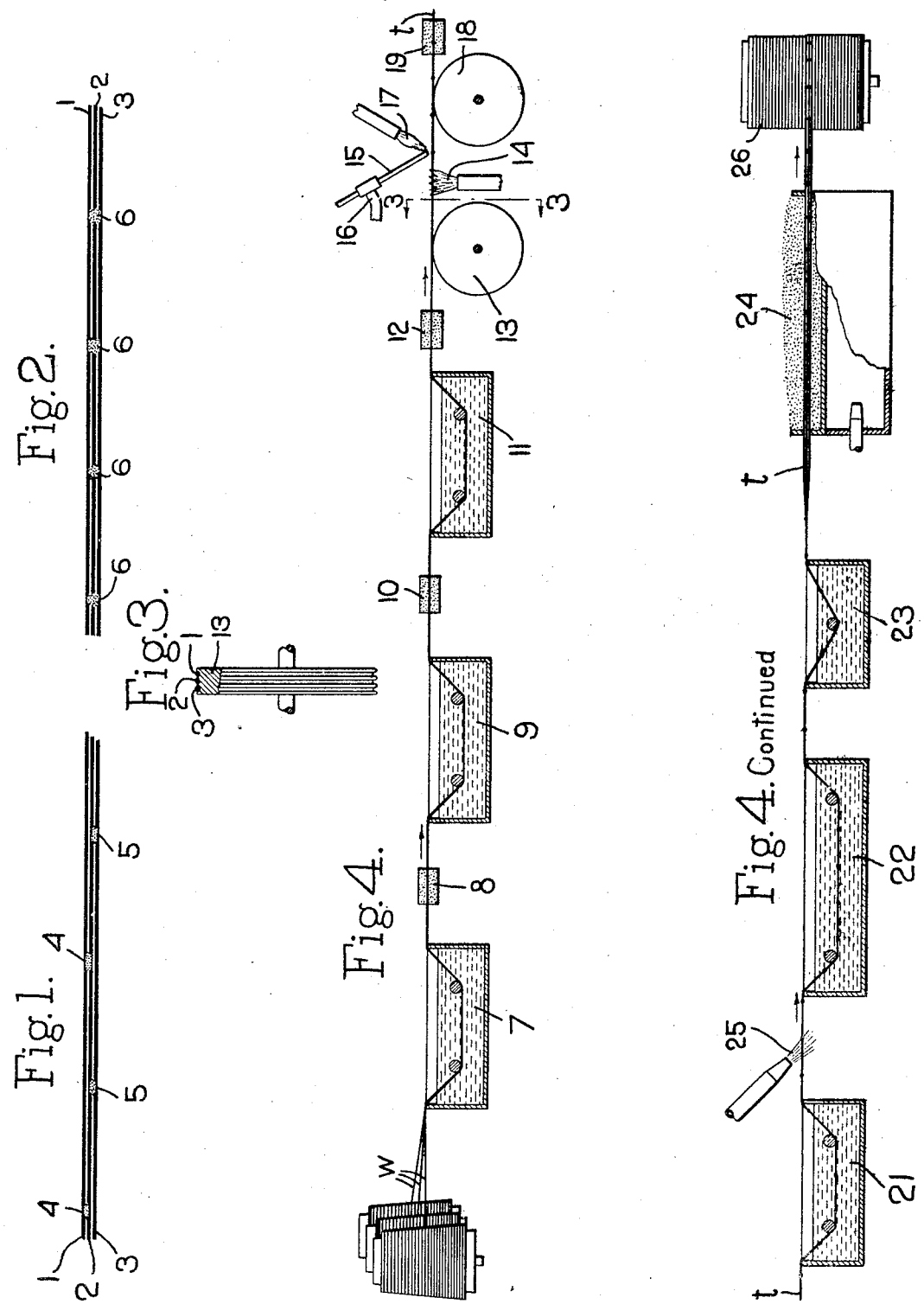
Inventor.
Charles D. Johnson
by Heard Smith & Tennant
Attys.

Patented Sept. 13, 1932

1,876,953

UNITED STATES PATENT OFFICE

CHARLES D. JOHNSON, OF WORCESTER, MASSACHUSETTS, ASSIGNOR TO JOHNSON STEEL & WIRE COMPANY, INC., OF WORCESTER, MASSACHUSETTS, A CORPORATION OF MASSACHUSETTS

METHOD OF MAKING WIRE TAPE

Application filed April 3, 1930. Serial No. 441,364.

This invention relates to so-called "wire tape" which is used in the manufacture of tire casings.

In the making of automobile tires it is customary to place a wire tape, so-called, in each bead of the tire casing and the tape which is now commonly used comprises three or more wires arranged in spaced parallel relation and connected together by a cross wire which is interwoven with the longitudinal wires.

It is one object of my present invention to provide an improved method of making a wire tape suitable for use in tire casings. The wire tape made in accordance with this invention comprises a plurality of wires arranged in spaced parallel relation and rigidly connected together at spaced intervals by solder or by some other suitable means whereby each wire is prevented from any turning or twisting movement relative to any other wire. Where the wires are soldered together the soldering of the wires is preferably done progressively as the wires are moving forward in spaced parallel relation. The wires forming the tape are often coated with a copper coating and if this is desired my invention comprehends a method by which the wires can be soldered together and coated as one continuous operation.

In the wire tape made in accordance with this invention the spaced wires are rigidly connected together at intervals with the solder and, therefore, each wire is held rigidly in its position relative to the other wires of the tape. Moreover, the rigid connection between the wires resulting from the soldering of them together at spaced intervals, prevents the individual wires from turning on their axes relative to other wires and hence a tape embodying my invention will maintain its flat shape and will not tend to curl or spiral as frequently happens in the case of a wire tape wherein the wires are connected by the tie wire interwoven therewith.

In order to give an understanding of the invention I have illustrated in the drawing some selected embodiments thereof which will now be described after which the novel features will be pointed out in the appended claims.

In the drawing, Fig. 1 is a view representing one form of wire tape embodying my invention;

Fig. 2 is a similar view illustrating a different form of tape embodying the invention;

Fig. 3 is an enlarged sectional view on the line 3—3, Fig. 4;

Fig. 4 is a diagrammatic view illustrating the tape embodying my invention;

The wire tape shown in Fig. 1 comprises three strands of wire 1, 2 and 3 which are arranged in parallel spaced relation, said wires being rigidly connected together at intervals by solder or some other suitable material as shown at 4 and 5.

In Fig. 1, the wires 1 and 2 are united by solder or other material at the points 4 while the wires 2 and 3 are united by solder or other material at spaced intervals 5. The places 4 at which the wires 1 and 2 are soldered together are staggered or alternate with the places 5 at which the wires 2 and 3 are soldered together. In Fig. 2 a form of wire tape is shown in which all the wires of the tape are soldered together at the same spaced intervals 6.

With this construction each wire is rigidly connected to its adjacent wire at spaced intervals and hence the wires are prevented from shifting their position relative to each other either longitudinally or about their axes. A wire tape having this construction will not twist or curl but will retain its flat shape.

My present invention relates to a novel method of making a wire tape of this type in accordance with which the individual wires forming the tape are soldered together progressively as the wires are being moved forward in parallel spaced relation.

In Fig. 4, I have illustrated diagrammatically how this may be accomplished. The wires which are to make up the tape are first cleaned by passing them through an acid bath and after being washed are passed through a soldering acid bath to prepare them for the soldering operation. From this bath the wires pass through a soldering device which is constructed to drop solder on the wires at spaced intervals thereby uniting the wires as above described. If it is desired that the wires forming the tape should be copper plated then the soldered-together wires may be passed through a plating bath by which the copper plate will be applied.

Referring now in detail to Fig. 4, 7 indicates an acid bath through which the wires, indicated at w, and from which tape is to be formed, are passed for the purpose of cleaning them. Since said Fig. 4 is in the nature of a diagrammatic side view only a single strand of wire is shown, it being understood that the other strands are arranged parallel to this strand and in a plane perpendicular to the paper.

After passing through the acid bath 7 the wires pass between wipers 8 which remove surplus acid and thence are taken through a water bath 9 by which the acid is washed off. From the bath 9 the wires pass through other wipers 10 to wipe off surplus water. The wires now have been cleaned ready for the fluxing bath or soldering acid bath which is contained in a tank 11. The cleaned wires are passed through the acid bath 11 thereby receiving the coating of acid necessary to perform the soldering operation.

After leaving the bath 11 the wire is passed between other wipers 12 which removes surface acid and then they pass over grooved rollers 13 which serve to space the wires the proper distance apart. From the rollers 13 the wire is passed to the soldering device by which the solder is deposited on the prepared wires at spaced intervals.

Any soldering device suitable for this purpose may be used and I have not attempted herein to illustrate in detail a complete soldering device. The soldering device illustrated comprises means for holding a stick of solder with its end in close proximity to the wires and means for heating the end of the stick of solder thereby fusing it so that drops of solder will be dropped therefrom at more or less regular intervals of time.

In Fig. 4, I have illustrated at 14 means for heating the wire just before the solder is applied so that the solder will be dropped onto heated wire. This wire-heating means may be of any suitable type and I have illustrated for this purpose a gas flame although any other means for heating the wire might be used without departing from the invention.

15 indicates a stick of solder supported by suitable holders 16 so that the lower end of the stick is close to the wire and 17 indicates a gas flame or other heating device by which the lower end of the solder stick is heated sufficiently to cause the solder to fuse so that drops of solder will be delivered therefrom at more or less regular time intervals.

If the tape construction shown in Fig. 1 is to be made it may be desirable to have two solder sticks, one for dropping the solder at the points 4 and the other for dropping the solder at the points 5. Hence as the spaced wires move past the soldering device the solder will be deposited thereon at spaced intervals.

After leaving the soldering device the soldered-together wires pass over other direction pulleys 18 and thence through wipers 19 which wipe off any surplus solder and especially any solder which may be on the top or bottom of the wires. The action of the wipers is to force any such surplus solder into the space between the wires so that the soldered-together wires will not be thicker at the places where the solder occurs due to solder overlying the top and bottom of the wire.

If it is desired that the wires of which the tape is made should be plated with copper or other plating material then I propose to pass the wires soldered together in the tape form through a plating apparatus so that the soldering and plating will be performed as a continuous operation. Before the wires can be plated it is necessary that they should be clean and so the wires, which are now in tape form, as indicated at t, are passed through a washing bath 21 and then through a plating bath 22 which contains the plating solution. After the tape t emerges from the water bath it is desirable that it should be dried before it enters the plating bath and to provide for this I have shown an air blast 25 arranged to deliver air under pressure against the tape, this air blast serving to blow any surface water therefrom and simultaneously to dry the tape.

After passing through the plating bath 22 the tape t is again washed by passing it through a water bath 23 and then it is completed by thoroughly drying it. This may conveniently be accomplished by passing the tape through a bed 24 of heated sand or gravel. The heat from the heated sand or gravel bed thoroughly evaporates all moisture from the tape and the sand or gravel has a scouring or polishing action on the tape so that it will emerge from this sand bed thoroughly dry and clean.

In passing through the sand bed it is preferable to have the wire tape stand on edge as shown because when the tape is in this position there is less likelihood that it will drag the sand out of the bed than if the tape were in a horizontal position.

After coming from the sand bed 24 the tape may be wound on a spool 26.

I claim:

1. The method of making wire tape which consists in arranging a plurality of wires in parallel spaced relation, moving the spaced wires forwardly in the direction of their length at a uniform speed and at the same time maintaining the spacing and then soldering the wires together at spaced intervals along their length during their forward movement.

2. The method of making a wire tape which consists in passing a plurality of wires arranged in spaced parallel relation through an acid bath, soldering said wires together at spaced intervals while maintaining the spaced relation thereby to form the wire tape, passing the wire tape through a bath of plating material thereby to plate the wires, washing the tape and then passing the tape through a bed of heated granular material thereby to dry the tape and polish the wires thereof.

3. The method of making a wire tape for building tire casings which consists in arranging a plurality of wires in spaced parallel relation in a horizontal plane, soldering said wires together at spaced intervals along their length thereby to form the wire tape, passing the wire tape through a bath of plating material whereby it is plated, washing the plated tape, passing the tape through a bed of heated granular material and while so doing maintaining the tape in a vertical plane.

4. The method of making a wire tape for use in building tire casings, which consists in arranging a plurality of wires in parallel spaced relation, moving the wires forwardly in the direction of their length and at the same time preserving the spaced relation, and as the wires are thus moving forward connecting them rigidly together at spaced intervals from one end to the other thereof by means which maintains the spaced relationship and prevents movement of any wire relative to the other wires either in the direction of the length of the wire or about the axis of the wire whereby a tape is produced having open spaces between the wires and the means connecting them.

In testimony whereof, I have signed my name to this specification.

CHARLES D. JOHNSON.